United States Patent
Shroff Rama et al.

(10) Patent No.: US 10,221,352 B2
(45) Date of Patent: Mar. 5, 2019

(54) THERMOSET COATING COMPOSITIONS FOR SAND PARTICULATES IN SUBTERRANEAN OPERATIONS

(71) Applicant: Halliburton Energy Services, Inc., Houston, TX (US)

(72) Inventors: Mallikarjuna Shroff Rama, Pune (IN); Rajender Salla, Pune (IN); Neelam Deepak Raysoni, Pune (IN)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/562,307

(22) PCT Filed: Apr. 29, 2015

(86) PCT No.: PCT/US2015/028213
§ 371 (c)(1),
(2) Date: Sep. 27, 2017

(87) PCT Pub. No.: WO2016/175784
PCT Pub. Date: Nov. 3, 2016

(65) Prior Publication Data
US 2018/0051202 A1   Feb. 22, 2018

(51) Int. Cl.
| | | |
|---|---|---|
| *E21B 43/267* | (2006.01) | |
| *E21B 43/22* | (2006.01) | |
| *C09K 8/80* | (2006.01) | |
| *C09K 8/62* | (2006.01) | |
| *C09K 8/575* | (2006.01) | |
| *C09K 8/88* | (2006.01) | |

(Continued)

(52) U.S. Cl.
CPC ............ *C09K 8/805* (2013.01); *C09K 8/5751* (2013.01); *C09K 8/62* (2013.01); *C09K 8/882* (2013.01); *C09K 8/887* (2013.01); *C09K 8/90* (2013.01); *E21B 43/267* (2013.01); *C09K 8/56* (2013.01)

(58) Field of Classification Search
CPC .. C09K 8/805; C09K 8/80; C09K 8/62; E21B 43/267; E21B 43/025; E21B 43/04; E21B 33/138; E21B 37/06; E21B 37/08; E21B 33/14; E21B 43/261
See application file for complete search history.

(56) References Cited

U.S. PATENT DOCUMENTS

| | | |
|---|---|---|
| 3,935,339 A | 1/1976 | Cooke, Jr. |
| 4,664,819 A | 5/1987 | Glaze et al. |
| 4,829,100 A | 12/1989 | Murphey et al. |

(Continued)

OTHER PUBLICATIONS

International Preliminary Report on Patentability issued in related PCT Application No. PCT/US2015028213, dated Nov. 9, 2017, 8 pages.

(Continued)

*Primary Examiner* — Zakiya W Bates
(74) *Attorney, Agent, or Firm* — Thomas Rooney; Baker Botts L.L.P.

(57) ABSTRACT

Methods of using coated particulates in subterranean operations such as gravel packing, frac-packing, and hydraulic fracturing are provided. The coated particulate comprises a particulate coated with a coating composition. The coating composition comprises: a coupling agent having at least two silane groups and at least one reactive functional group, a hardener, and a curable resin.

17 Claims, 2 Drawing Sheets

(51) Int. Cl.
*C09K 8/90* (2006.01)
*C09K 8/56* (2006.01)

(56) References Cited

U.S. PATENT DOCUMENTS

| | | |
|---|---|---|
| 7,235,683 B2 | 6/2007 | Janeiro et al. |
| 8,113,283 B2 | 2/2012 | Welton et al. |
| 8,136,593 B2 | 3/2012 | Weaver et al. |
| 8,261,833 B2 | 9/2012 | Nguyen et al. |
| 8,586,509 B2 | 11/2013 | Welton et al. |
| 2006/0223911 A1* | 10/2006 | Bardman ................ C09K 9/00 |
| 2010/0282465 A1 | 11/2010 | Weaver et al. |
| 2014/0338906 A1 | 11/2014 | Monastiriotis et al. |
| 2014/0357535 A1 | 12/2014 | Tang et al. |

OTHER PUBLICATIONS

International Search Report and Written Opinion issued in related PCT Application No. PCT/US2015/028213 dated Jan. 29, 2016, 11 pages.

* cited by examiner

THERMOSET COATING COMPOSITIONS FOR SAND PARTICULATES IN SUBTERRANEAN OPERATIONS

CROSS-REFERENCE TO RELATED APPLICATION

The present application is a U.S. National Stage Application of International Application No. PCT/US2015/028213 filed Apr. 29, 2015, which is incorporated herein by reference in its entirety for all purposes.

BACKGROUND

The present disclosure relates to methods of using polymer-coated particulates in subterranean operations such as gravel packing, frac-packing, sand control and hydraulic fracturing.

Hydrocarbon-producing wells are often stimulated by hydraulic fracturing treatments. In hydraulic fracturing treatments, a viscous fracturing fluid is pumped into a producing zone at a rate and pressure such that the subterranean formation breaks down and one or more fractures are formed or extended in the zone. Particulate solids, such as graded sand, synthetic particulates, and composites which are often referred to as "proppant" may be suspended in a portion of the fracturing fluid and then deposited in the fractures when the fracturing fluid is converted to a thin fluid to be returned to the surface. These particulates serve, among other things, to prevent the fractures from fully closing so that conductive channels are formed through which produced hydrocarbons may flow.

Hydrocarbon-producing wells may also undergo gravel packing treatments to, inter alia, reduce the migration of unconsolidated formation particulates into the well bore. In gravel packing operations, particulates, often referred to in the art as gravel, are suspended in a treatment fluid, which may be viscosified, and the treatment fluid is pumped into a well bore in which the gravel pack is to be placed. As the particulates are placed in or near the zone, the treatment fluid either is returned to the surface or leaks off into the subterranean zone. The resultant gravel pack acts as a filter to prevent the production of the formation solids with the produced fluids. Traditional gravel pack operations involve placing a gravel pack screen in the well bore and then packing the surrounding annulus between the screen and the well bore with gravel. The gravel pack screen is generally a filter assembly used to support and retain the gravel placed during the gravel pack operation. A wide range of sizes and screen configurations is available to suit the characteristics of a well bore, the production fluid, and any particulates in the subterranean formation.

In some situations, hydraulic fracturing and gravel packing operations may be combined into a single treatment. Such treatments are often referred to as "frac pack" operations. In some cases, the treatments are generally completed with a gravel pack screen assembly in place with the hydraulic fracturing treatment being pumped through the annular space between the casing and screen. In this situation, the hydraulic fracturing treatment ends in a screen-out condition, creating an annular gravel pack between the screen and casing. In other cases, the fracturing treatment may be performed prior to installing the screen and placing a gravel pack.

BRIEF DESCRIPTION OF THE DRAWINGS

These drawings illustrate certain aspects of some of the embodiments of the present disclosure, and should not be used to limit or define the claims.

Figure 1:
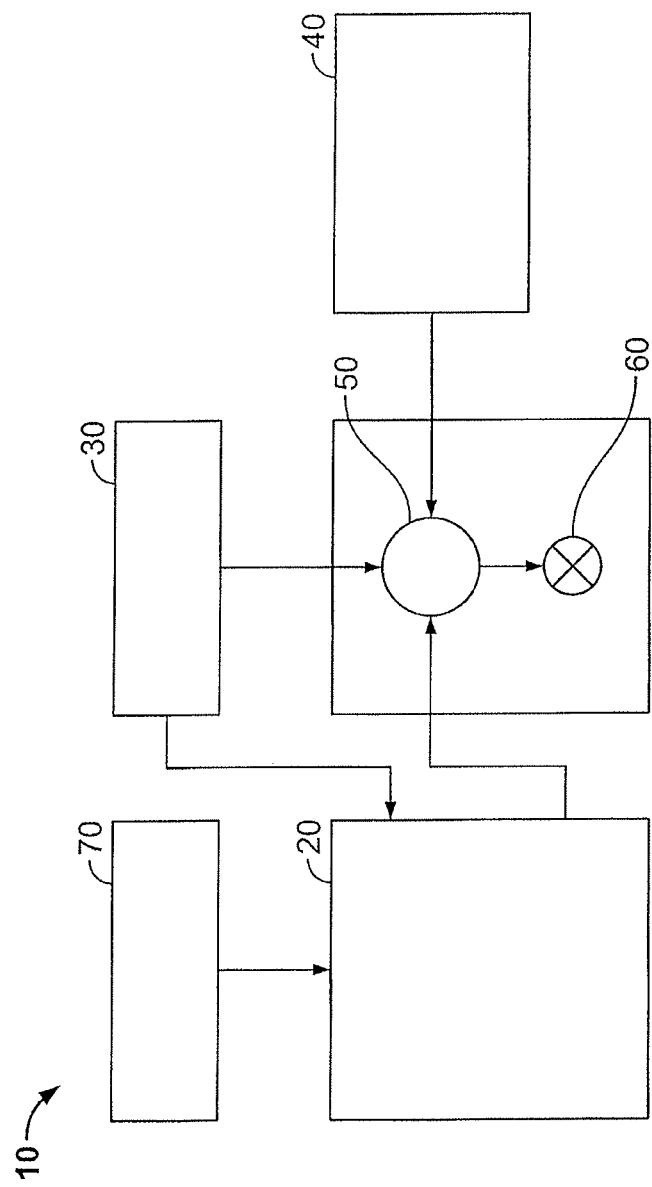
FIG. 1 is a diagram illustrating an example of a fracturing system that may be used in accordance with certain embodiments of the present disclosure.

While embodiments of this disclosure have been depicted, such embodiments do not imply a limitation on the disclosure, and no such limitation should be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DESCRIPTION OF CERTAIN EMBODIMENTS

The present disclosure relates to systems and methods for treating subterranean formations. More particularly, the present disclosure relates to systems and methods for coating particulates for use in treating subterranean formations.

The present disclosure provides methods and systems for coating particulates with a coating composition. As used herein, the terms "coat," "coating," "coating composition," or variations thereof refers to the deposition of some amount of a coating material or composition on at least a portion of a solid surface. None of these terms should be construed as requiring complete coverage or any particular amount of coverage of the surface. Rather, "coating" may refer to complete coating or any degree of partial coating of the surface of a particulate. The coating composition comprises: a coupling agent having at least two silane groups and at least one reactive functional group, a hardener, and a curable resin. The coupling agent may enable the coating composition to adhere to the surface of particulates by bonding to the surface of the particulate and to the curable resin. The hardener may harden the coating composition by crosslinking the curable resin molecules with both other curable resin molecules and with coupling agent molecules.

Without limiting the disclosure to any particular theory or mechanism, the coupling agent may include silylating (e.g., silane) groups that may bond to the surface of the particulates. A coupling agent with multiple silane groups may form stronger bonds with the surface of particulates than a coupling agent having a single silane group. The general formula for such a multipodal silane coupling agent is given below by Formula 1:

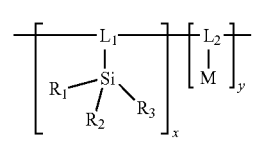

Formula 1

The coupling agent described by Formula 1 may have silane groups and reactive functional groups. $R_1$, $R_2$, and $R_3$ represent alkoxy or halide portion of the silane group. M represents a reactive functional group. $L_1$ and $L_2$ each represent spacer groups that connect the reactive functional and silane groups. In particular embodiments, the spacer groups $L_1$ and $L_2$ may be alkylene groups, alkoxylene groups, heterocyclic groups, aromatic groups, alicyclic groups and the like. X represents the number of silane groups in the coupling agent. According to the present disclosure, the number of silane groups in the coupling agent (X) is at least two. Y represents the number of reactive functional groups in the coupling agent. According to the present disclosure, the number of reactive functional groups in the coupling agent (Y) is at least one.

The reactive functional group (M) may determine what types of curable resins the coupling agent may bond to. For example, Table 1 below shows a non-exhaustive list of possible functional groups and non-limiting examples of corresponding curable resins that may bind to the functional groups.

TABLE 1

| Functional Group | Curable Resin |
|---|---|
| amino group | Acrylic, Nylon, Epoxy, Phenolics, PVC, Urethanes, Melamines, Nitrile Rubber |
| benzylamino group | Epoxies for PCBs, Polyolefins, All Polymer Types |
| chloropropyl group | Urethanes, Epoxy, Nylon, Phenolics, Polyolefins |
| disulfido group | Organic Rubber |
| epoxy group | Epoxy, PBT, Urethanes, Acrylics, Polysulfides |
| epoxy/melamine group | Epoxy, Urethanes, Phenolics, PEEK, Polyester |
| mercapto group | Organic Rubber |
| methacrylate group | Unsaturated Polyesters, Acrylics, EVA, Polyolefin |
| tetrasulfido group | Organic Rubber |
| ureido group | Asphaltic Binders, Nylon, Phenolics, Urethanes |
| vinyl group | Graft to Polyethylene for Moisture Crosslinking, EPDM Rubber, SBR, Polyolefins |
| vinyl-benzyl-amino group | Epoxies for PCBs, Polyolefins, All Polymer Types |

Having a number of silane groups equal to or greater than two may allow for the coupling agent to more effectively couple to particulates than coupling agents having a single silane group. More effectively coupling between the coupling agent and the particulates may allow for a thinner coating of resin to be used than when using a coupling agent containing only one silane group.

A hardener is a compound which may used to crosslink the curable resin molecules of the coating composition. The hardener may have functional groups corresponding to the curable resin used as shown in Table 1. In some embodiments, the hardener, the curable resin or both the hardener and the curable resin may have more than three functional groups to cause the curable resin to be cross-linked. In some embodiments, the hardener may also link the coupling agent with the curable resin. Examples of hardeners may include at least one of an amine, an aromatic amine, an aliphatic amine, a cyclo-aliphatic amine, polyamines, amides, polyamides, piperidine, diethylene tetramine, ethylene diamine, triethylamine, benzyldimethylamine, diethyl toluene diamine, a cycloalkylamine, 3-(aminomethyl)-3,5,5 trimethylcyclohexanamine, N,N-dimethylaminopyridine, 2-(N,N-dimethylaminomethyl)phenol, tris(dimethylaminomethyl) phenol, N-2-(aminoethyl)-3-aminopropyltrimethoxysilane, 3-glycidoxypropyltrimethoxysilane, n-beta-(aminoethyl)-gamma-aminopropyl trimethoxysilane, n-beta-(aminoethyl)-gamma-aminopropyl trimethoxysilane, piperazine, derivatives of piperazine (e.g., aminoethylpiperazine), pyrrole, imidazole, pyrazole, pyridine, pyrazine, pyrimidine, pyridazine, indolizine, isoindole, indole, indazole, purine, quinolizine, quinoline, isoquinoline, phthalazine, naphthyridine, quinoxaline, quinazoline, carbazole, carbazole, phenanthridine, acridine, phenathroline, phenazine, imidazolidine, phenoxazine, cinnoline, pyrrolidine, pyrroline, imidazoline, piperidine, indoline, isoindoline, quinuclindine, morpholine, azocine, azepine, azepine, 1,3,5-triazine, thiazole, pteridine, dihydroquinoline, hexa methylene imine, indazole, polyamines, amides, polyamides, 2-ethyl-4-methyl imidazole, 1,1,3-trichlorotrifluoroacetone, and combinations thereof. The hardener can form any suitable wt % of the coating composition, such as about 0.001 wt % to about 50 wt %, about 0.01 wt % to about 20 wt %, or about 0.001 wt % or less, or about 0.01 wt %, 1, 2, 3, 4, 5, 10, 15, 20, 25, 30, 35, 40, 45, or about 50 wt % or more.

In certain embodiments, the coupling agent may be combined with the curable resin and the hardener before the coating composition is applied to the particulate. In other embodiments, the coupling agent may be applied to the particulates as a primer before coating the particulates with the curable resin and the hardener.

An example reaction for preparing a coupling agent having amino reactive functional groups and at least two silane groups is shown below in Formula 2:

Formula 2

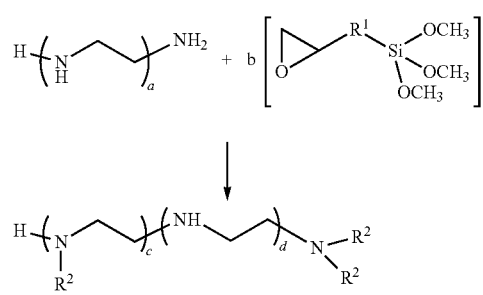

Formula 3 illustrates two possible chemical formulas for $R^2$ shown in Formula 2: a silane group or hydrogen. $R^1$ as shown in Formula 2 may be an alkylene chain or alkylene with a hetero atom or substitution.

Formula 3

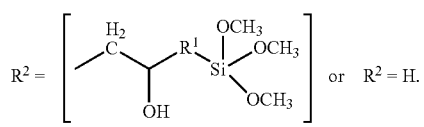

The coupling agent with an amino group reactive functional group described by Formula 2 may be used with various curable resins such those listed in Table 1, including but not limited to as acrylics, nylons, epoxies, phenolics, PVC, urethanes, melamines, nitrile rubbers, combinations thereof, and the like.

Formula 4 shows another example of a coupling agent containing multiple silane groups and amino reactive functional groups. The multipodal silane coupling agent shown in Formula 4 may be prepared from natural carbohydrate source materials such as ribose sugar or tartaric acid.

Formula 4

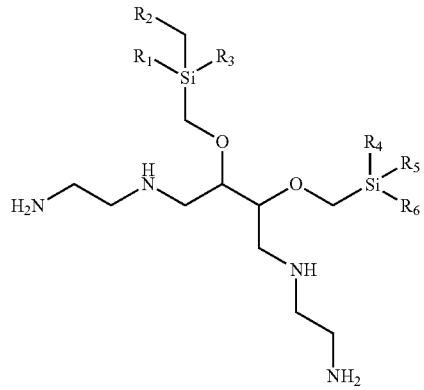

Formula 5 illustrates example isomer coupling agents having epoxy reactive functional groups and multiple silane groups. The multipodal silane coupling agents illustrated by Formula 5 may be prepared from natural carbohydrate source materials such as ribose sugar or tartaric acid. The coupling agents illustrated in Formula 5 containing epoxy reactive functional groups may be used with curable resins such as those listed in Table 1, including but not limited to epoxies, PBT, urethanes, acrylics, polysulfides, combinations thereof, and the like.

Formula 5

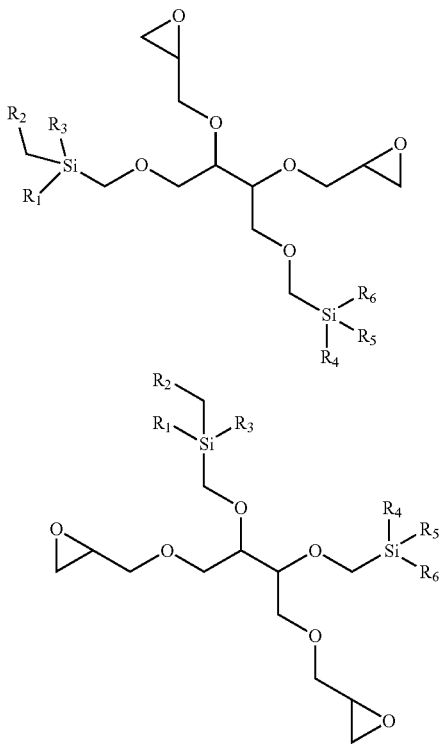

Formula 6 illustrates example isomer coupling agents having acrylate reactive functional groups and multiple silane groups. The multipodal silane coupling agents illustrated by Formula 6 may be prepared from natural carbohydrate source materials such as ribose sugar or tartaric acid. The coupling agents illustrated in Formula 6 containing acrylate reactive functional groups may be used with curable resins such as those listed in Table 1, including but not limited to unsaturated polyesters, acrylics, EVA, polyolefins, combinations thereof, and the like.

Formula 6

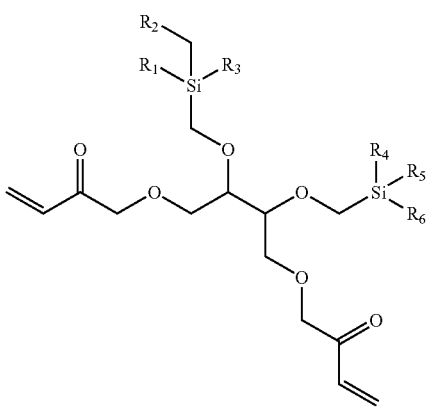

-continued

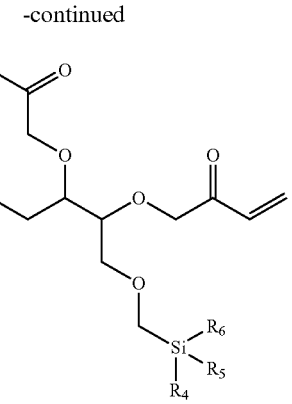

Among the many potential advantages to the methods and compositions of the present disclosure, only some of which are alluded to herein, the methods, compositions, and systems of the present disclosure may increase the strength and crush resistance of particulates used in subterranean treatments such as fracturing or gravel packing operations, or as cement composition fillers.

Particulates may be used for treating subterranean zones or formations penetrated by well bores. The particulates may be used for forming gravel packs, as fracturing propping agents (proppants) and as cement composition fillers. In many such applications, the particulates placed into the subterranean formations should possess high crush resistance depending upon closure stress. For example, a crush resistance greater than 6000 PSI may be desirable for use in certain subterranean formations. If the particulates placed into the subterranean formation do not possess sufficient crush resistance (e.g., higher than the confining pressures of the subterranean formation), the particulates may be crushed by the pressure of the subterranean formation and produce fines and small particles that may deteriorate the conductivity of the formation and affect production. [41]In the methods, systems, and/or compositions of the present disclosure, sand or other particulates may be coated with the coating composition described in the present disclosure to increase the crush resistance strength of the proppant.

In certain embodiments, naturally occurring sand may be used as a particulate for treating subterranean zones. For example, sand obtained from deserts, sand mines, beaches, or rivers, may be naturally abundant close to well bores. Sand obtained from one of these sources is sometimes known or referred to as "natural sand" or "Saudi sand". Naturally occurring sand may also be obtained from other countries and locations. In some embodiments, the coating of Saudi sand using a multipodal silane coupling agent, curable resin, and hardener may provide the coated sand with sufficiently high crush resistance to be placed into subterranean formations with closure pressures of more than 6000 PSI. In other embodiments, any appropriate material may be used as a coated particulate using a multipodal silane coupling agent.

The coated particulates of the present disclosure may be prepared using any suitable method and/or equipment (e.g., blenders, mixers, sprayers, stirrers, etc.) known in the art at any time prior to their use. The coated particulates may be prepared at a well site or at an offsite location. In certain embodiments, the multipodal silane coupling agent, curable resin, and/or hardener may be coated onto particulates at a well site where a gravel packing, sand controlling, frac-packing, or fracturing operation is conducted, either by batch mixing or continuous ("on-the-fly") coating. The term "on-the-fly" is used herein to include methods of combining two or more components wherein a flowing stream of one element is continuously introduced into a flowing stream of another component so that the streams are combined and mixed while continuing to flow as a single stream as part of the on-going treatment. Such mixing can also be described as "real-time" mixing and coating. For example, a stream of particulates may be continuously introduced into a stream of the coating composition of the present disclosure (e.g. the coupling agent, curable resin, and hardener). In other embodiments, the coated particulates of the present disclosure may be prepared, either in whole or in part, at an offsite location and transported to the site where the treating operation is conducted.

The exemplary methods and compositions disclosed herein may directly or indirectly affect one or more components or pieces of equipment associated with the preparation, delivery, recapture, recycling, reuse, and/or disposal of the disclosed compositions. For example, and with reference to FIG. 1, the disclosed methods and compositions may directly or indirectly affect one or more components or pieces of equipment associated with an exemplary fracturing system 10, according to one or more embodiments. In certain instances, the system 10 includes a fracturing fluid producing apparatus 20, a fluid source 30, a proppant source 40, and a pump and blender system 50 and resides at the surface at a well site where a well 60 is located. In certain instances, the fracturing fluid producing apparatus 20 combines a gel pre-cursor with fluid (e.g., liquid or substantially liquid) from fluid source 30, to produce a hydrated fracturing fluid that is used to fracture the formation. The hydrated fracturing fluid can be a fluid for ready use in a fracture stimulation treatment of the well 60 or a concentrate to which additional fluid is added prior to use in a fracture stimulation of the well 60. In other instances, the fracturing fluid producing apparatus 20 can be omitted and the fracturing fluid sourced directly from the fluid source 30. In certain instances, the fracturing fluid may comprise aqueous fluids (e.g., water, brines, seawater, etc.), a hydrocarbon fluid, a polymer gel, foam, air, wet gases and/or other fluids.

The proppant source 40 can include a proppant for combination with the fracturing fluid. The proppant may include or be a particulates coated with a multipodal silane coupling agent, curable resin, and a hardener as disclosed herein. In certain embodiments the proppant particulates may be coated "on-the-fly" at the well bore. The system may also include additive source 70 that provides one or more additives (e.g., gelling agents, weighting agents, and/or other optional additives) to alter the properties of the fracturing fluid. For example, the other additives 70 can be included to reduce pumping friction, to reduce or eliminate the fluid's reaction to the geological formation in which the well is formed, to operate as surfactants, and/or to serve other functions.

The pump and blender system 50 receives the fracturing fluid and combines it with other components, including proppant from the proppant source 40 and/or additional fluid from the additives 70. The resulting mixture may be pumped down the well 60 under a pressure sufficient to create or enhance one or more fractures in a subterranean zone, for example, to stimulate production of fluids from the zone. Notably, in certain instances, the fracturing fluid producing apparatus 20, fluid source 30, and/or proppant source 40 may be equipped with one or more metering devices (not shown) to control the flow of fluids, proppants, and/or other compositions to the pumping and blender system 50. Such metering devices may permit the pumping and blender system 50 can source from one, some or all of the different sources at a given time, and may facilitate the preparation of fracturing fluids in accordance with the present disclosure using continuous mixing or "on-the-fly" methods. Thus, for example, the pumping and blender system 50 can provide just fracturing fluid into the well at some times, just proppants at other times, and combinations of those components at yet other times.

Figure 2:
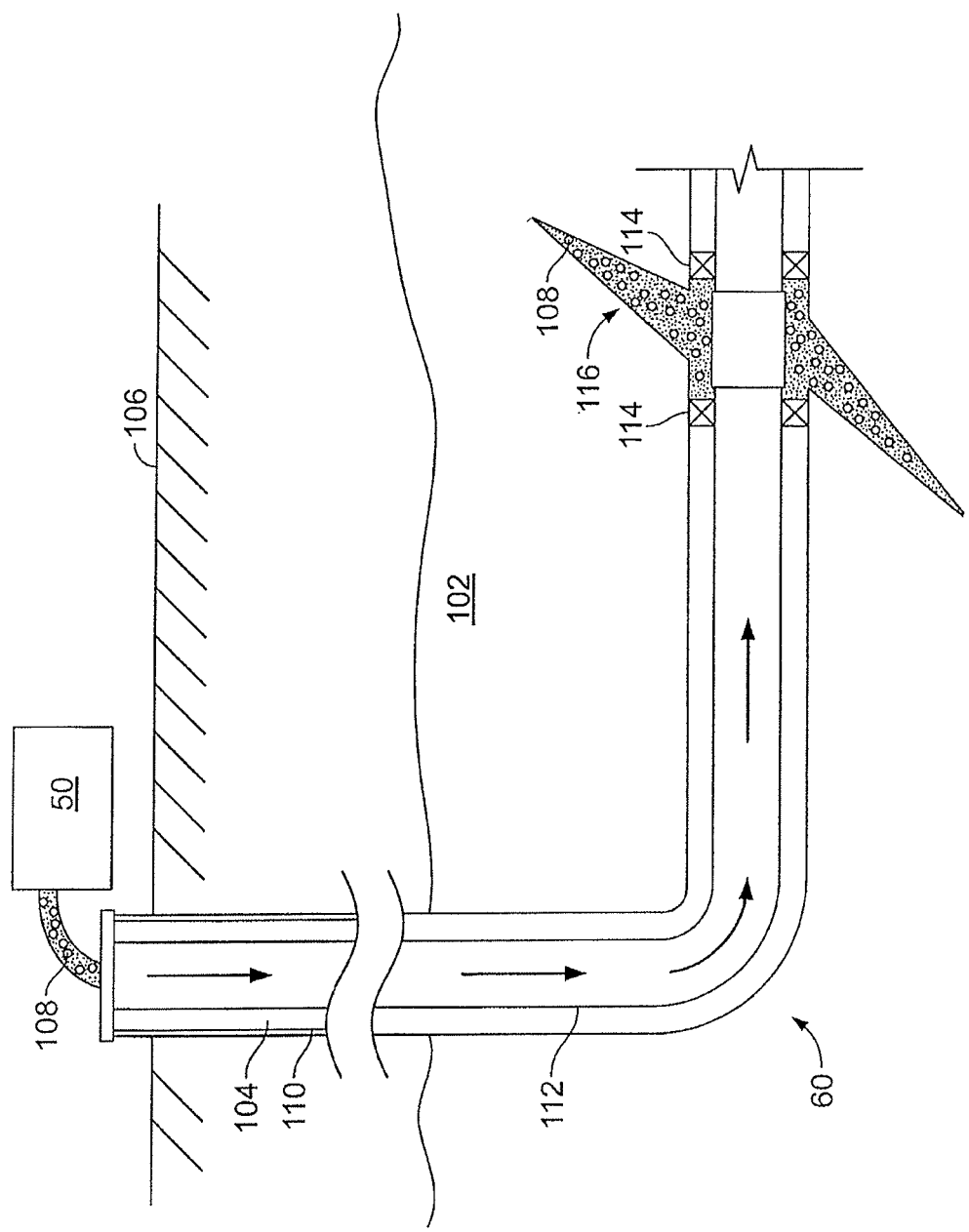
FIG. 2 is a diagram illustrating an example of a subterranean formation in which a fracturing operation may be performed in accordance with certain embodiments of the present disclosure.

FIG. 2 shows the well 60 during a fracturing operation in a portion of a subterranean formation of interest 102 surrounding a well bore 104. The well bore 104 extends from the surface 106, and the fracturing fluid 108 is applied to a portion of the subterranean formation 102 surrounding the horizontal portion of the well bore. Although shown as vertical deviating to horizontal, the well bore 104 may include horizontal, vertical, slant, curved, and other types of well bore geometries and orientations, and the fracturing treatment may be applied to a subterranean zone surrounding any portion of the well bore. The well bore 104 can include a casing 110 that is cemented or otherwise secured to the well bore wall. The well bore 104 can be uncased or include uncased sections. Perforations can be formed in the casing 110 to allow fracturing fluids and/or other materials to flow into the subterranean formation 102. In cased wells, perforations can be formed using shape charges, a perforating gun, hydro jetting and/or other tools.

The well is shown with a work string 112 descending from the surface 106 into the well bore 104. The pump and blender system 50 is coupled to the work string 112 to pump the fracturing fluid 108 into the well bore 104. The working string 112 may include coiled tubing, jointed pipe, and/or other structures that allow fluid to flow into the well bore 104. The working string 112 can include flow control devices, bypass valves, ports, and or other tools or well devices that control a flow of fluid from the interior of the working string 112 into the subterranean zone 102. For example, the working string 112 may include ports adjacent to the well bore wall to communicate the fracturing fluid 108 directly into the subterranean formation 102, and/or the working string 112 may include ports that are spaced apart from the well bore wall to communicate the fracturing fluid 108 into an annulus in the well bore between the working string 112 and the well bore wall.

The working string 112 and/or the well bore 104 may include one or more sets of packers 114 that seal the annulus between the working string 112 and well bore 104 to define an interval of the well bore 104 into which the fracturing fluid 108 will be pumped. FIG. 2 shows two packers 114, one defining an uphole boundary of the interval and one defining the downhole end of the interval. When the fracturing fluid 108 is introduced into well bore 104 (e.g., in FIG. 2, the area of the well bore 104 between packers 114) at a sufficient hydraulic pressure, one or more fractures 116 may be created in the subterranean zone 102. The proppant particulates in the fracturing fluid 108 may enter the fractures 116 where they may remain after the fracturing fluid flows out of the well bore. These proppant particulates may "prop" fractures 116 such that fluids may flow more freely through the fractures 116. The multipodal silane coupling agent, curable resin, and hardener coating composition of coated proppant particulates may provide high strength and crush resistance sufficient to prevent the proppant particulates from being crushed at the pressures present in the fractured formation. In particular embodiments, proppant particulates may be coated at the site of the wellbore.

While not specifically illustrated herein, the disclosed methods and compositions may also directly or indirectly affect any transport or delivery equipment used to convey the compositions to the fracturing system 10 such as, for example, any transport vessels, conduits, pipelines, trucks, tubulars, and/or pipes used to fluidically move the compositions from one location to another, any pumps, compressors, or motors used to drive the compositions into motion, any valves or related joints used to regulate the pressure or flow rate of the compositions, and any sensors (i.e., pressure and temperature), gauges, and/or combinations thereof, and the like.

The treatment fluids used in the methods and systems of the present disclosure may comprise any base fluid known in the art, including aqueous base fluids, non-aqueous base fluids, and any combinations thereof. The term "base fluid" refers to the major component of the fluid (as opposed to components dissolved and/or suspended therein), and does not indicate any particular condition or property of that fluids such as its mass, amount, pH, etc. Aqueous fluids that may be suitable for use in the methods and systems of the present disclosure may comprise water from any source. Such aqueous fluids may comprise fresh water, salt water (e.g., water containing one or more salts dissolved therein), brine (e.g., saturated salt water), seawater, produced water, re-used water or any combination thereof. In most embodiments of the present disclosure, the aqueous fluids comprise one or more ionic species, such as those formed by salts dissolved in water. For example, seawater and/or produced water may comprise a variety of divalent cationic species dissolved therein. In certain embodiments, the density of the aqueous fluid can be adjusted, among other purposes, to provide additional particulate transport and suspension in the compositions of the present disclosure. In certain embodiments, the pH of the aqueous fluid may be adjusted (e.g., by a buffer or other pH adjusting agent) to a specific level, which may depend on, among other factors, the types of viscosifying agents, acids, and other additives included in the fluid. One of ordinary skill in the art, with the benefit of this disclosure, will recognize when such density and/or pH adjustments are appropriate. Examples of non-aqueous fluids that may be suitable for use in the methods and systems of the present disclosure include, but are not limited to, oils, hydrocarbons, organic liquids, and the like. In certain embodiments, the fracturing fluids may comprise a mixture of one or more fluids and/or gases, including but not limited to emulsions, foams, and the like.

In certain embodiments, the treatment fluids used in the methods and systems of the present disclosure optionally may comprise any number of additional additives. Examples of such additional additives include, but are not limited to, salts, surfactants, acids, proppant particulates, diverting agents, fluid loss control additives, gas, nitrogen, carbon dioxide, surface modifying agents, tackifying agents, foamers, corrosion inhibitors, scale inhibitors, catalysts, clay control agents, biocides, friction reducers, antifoam agents, bridging agents, flocculants, additional $H_2S$ scavengers, $CO_2$ scavengers, oxygen scavengers, lubricants, additional viscosifiers, breakers, weighting agents, relative permeability modifiers, resins, wetting agents, coating enhancement agents, filter cake removal agents, antifreeze agents (e.g., ethylene glycol), and the like. In certain embodiments, one or more of these additional additives (e.g., a crosslinking agent) may be added to the treatment fluid and/or activated after the viscosifying agent has been at least partially hydrated in the fluid. A person skilled in the art, with the benefit of this disclosure, will recognize the types of additives that may be included in the fluids of the present disclosure for a particular application.

The present disclosure in some embodiments provides methods for using the treatment fluids and additives, including coated particulates, to carry out a variety of subterranean treatments, including but not limited to, hydraulic fracturing treatments, acidizing treatments, drilling operations, gravel packing operations, sand controlling operations, and cementing operations. In some embodiments, the treatment fluids of the present disclosure may be used in treating a portion of a subterranean formation, for example, in acidizing treatments such as matrix acidizing or fracture acidizing. In certain embodiments, a treatment fluid may be introduced into a subterranean formation. In some embodiments, the treatment fluid may be introduced into a well bore that penetrates a subterranean formation. In some embodiments, the treatment fluid may be introduced at a pressure sufficient to create or enhance one or more fractures within the subterranean formation (e.g., hydraulic fracturing).

In some embodiments, the coated particulates may be introduced at a pressure sufficient to cause at least a portion of the coated particulates to penetrate at least a portion of the subterranean formation, and the coated particulates may be allowed to interact with the subterranean formation so as to create one or more voids in the subterranean formation. Introduction of the coated particulates may in some of these embodiments be carried out at or above a pressure sufficient to create or enhance one or more fractures within the subterranean formation.

To facilitate a better understanding of the present disclosure, the following examples of certain aspects of preferred embodiments are given. The following examples are not the only examples that could be given according to the present disclosure and are not intended to limit the scope of the disclosure or claims.

An embodiment of the present disclosure is a method comprising: coating particulates with a coating composition. The coating composition comprises: a coupling agent having at least two silane groups and at least one reactive functional group, a hardener, and a curable resin.

Another embodiment of the present disclosure is a coated particulate comprising: a particulate coated with a coating composition. The coating composition comprises: a coupling agent having at least two silane groups and at least one reactive functional group, a hardener, and a curable resin.

Another embodiment of the present disclosure is a method comprising: coating particulates with a coating composition. The coating composition comprises: a coupling agent having at least two silane groups and at least one reactive functional group, a hardener, and a curable resin. The method also comprises introducing the coated particulates into at least a portion of a subterranean formation.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. While numerous changes may be made by those skilled in the art, such changes are encompassed within the spirit of the subject matter defined by the appended claims. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. In particular, every range of values (e.g., "from about a to about b," or, equivalently, "from approximately a to b," or, equivalently, "from approximately a-b") disclosed herein is to be understood as referring to the power set (the set of all subsets) of the respective range of values. The terms in the claims have their plain, ordinary meaning unless otherwise explicitly and clearly defined by the patentee.

What is claimed is:

1. A method comprising:
    coating particulates with a coating composition that comprises:
        a coupling agent having at least two silane groups and at least one reactive functional group, wherein the coupling agent is prepared from at least one compound of the group consisting of: a ribose sugar, a tartaric acid, and any combination thereof;
        a hardener; and
        a curable resin; and
    introducing the coated particulates into at least a portion of a subterranean formation.

2. The method of claim 1 wherein the coated particulates have a crush resistance greater than 6000 pounds per square inch.

3. The method of claim 1 wherein the reactive functional group comprises at least one functional group selected from the group consisting of: an amino group, a benzylamino group, a chloropropyl group, a disulfido group, an epoxy group, an epoxy/melamine group, a mercapto group, a methacrylate group, a tetrasulfido group, a ureido group, a vinyl group, a vinyl-benzyl-amino group, and any combination thereof.

4. The method of claim 1 wherein the particulates comprise sand.

5. The method of claim 1 wherein the particulates are coated on-the-fly.

6. The method of claim 1 wherein the curable resin comprises at least one curable resin selected from the group consisting of: an acrylic resin, a nylon resin, an epoxy resin, a phenolic resin, a PVC resin, a urethane resin, a melamine resin, a nitrile rubber resin, a polyolefin resin, an organic rubber resin, a PBT resin, a polysulfide resin, a PEEK resin, a polyester resin, an unsaturated polyester resin, an EVA resin, an asphaltic binder, and any combination thereof.

7. The method of claim 1 further comprising:
    combining the coated particulates with a base fluid to form a treatment fluid; and
    introducing the treatment fluid, using one or more pumps, into at least a portion of the subterranean at a pressure sufficient to create or enhance one or more fractures in at least a portion of the subterranean formation.

8. A method comprising:
    coating particulates with a coating composition that comprises:
        a coupling agent having at least two silane groups and at least one reactive functional group, wherein the coupling agent is prepared from at least one compound of the group consisting of: a ribose sugar, a tartaric acid, and any combination thereof;
        a hardener; and
        a curable resin.

9. The method of claim 8 wherein the coated particulates have a crush resistance greater than 6000 pounds per square inch.

10. The method of claim 8 wherein the reactive functional group comprises at least one functional group selected from the group consisting of: an amino group, a benzylamino group, a chloropropyl group, a disulfido group, an epoxy group, an epoxy/melamine group, a mercapto group, a methacrylate group, a tetrasulfido group, a ureido group, a vinyl group, a vinyl-benzyl-amino group, and any combination thereof.

11. The method of claim 8, wherein the particulates comprise sand.

12. The method of claim 8, wherein the curable resin comprises at least one curable resin selected from the group consisting of: an acrylic resin, a nylon resin, an epoxy resin, a phenolic resin, a PVC resin, a urethane resin, a melamine resin, a nitrile rubber resin, a polyolefin resin, an organic rubber resin, a PBT resin, a polysulfide resin, a PEEK resin, a polyester resin, an unsaturated polyester resin, an EVA resin, an asphaltic binder, and any combination thereof.

13. A coated particulate comprising a particulate coated with a coating composition that comprises:
    a coupling agent having at least two silane groups and at least one reactive functional group, wherein the coupling agent is prepared from at least one compound of the group consisting of: a ribose sugar, a tartaric acid, and any combination thereof;
    a hardener; and
    a curable resin.

14. The coated particulate of claim 13 wherein the coated particulates have a crush resistance greater than 6000 pounds per square inch.

15. The coated particulate of claim 13 wherein the reactive functional group comprises at least one functional group selected from the group consisting of: an amino group, a benzylamino group, a chloropropyl group, a disulfido group, an epoxy group, an epoxy/melamine group, a mercapto group, a methacrylate group, a tetrasulfido group, a ureido group, a vinyl group, a vinyl-benzyl-amino group, and any combination thereof.

16. The coated particulate of claim 13 wherein the particulates comprise sand.

17. The coated particulate of claim 13 wherein the curable resin comprises at least one curable resin selected from the group consisting of: an acrylic resin, a nylon resin, an epoxy resin, a phenolic resin, a PVC resin, a urethane resin, a melamine resin, a nitrile rubber resin, a polyolefin resin, an organic rubber resin, a PBT resin, a polysulfide resin, a PEEK resin, a polyester resin, an unsaturated polyester resin, an EVA resin, an asphaltic binder, and any combination thereof.

* * * * *